(12) United States Patent
Ruman et al.

(10) Patent No.: US 9,633,569 B2
(45) Date of Patent: *Apr. 25, 2017

(54) SYSTEMS AND METHODS FOR MANAGING THE TOILET TRAINING PROCESS OF A CHILD

(71) Applicant: Kimberly-Clark Worldwide, Inc., Neenah, WI (US)

(72) Inventors: Marcille Faye Ruman, Oshkosh, WI (US); Kelly Wade Jackson, Appleton, WI (US); Adam Howard Dreyer, Appleton, WI (US); Aster Ellen Kammrath, Neenah, WI (US); Larry Edgerton Brown, Appleton, WI (US); Yan Luo, New York, NY (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/886,865

(22) Filed: May 3, 2013

(65) Prior Publication Data
US 2014/0329212 A1    Nov. 6, 2014

(51) Int. Cl.
G09B 19/00    (2006.01)
G09B 5/06    (2006.01)

(52) U.S. Cl.
CPC ........... *G09B 5/06* (2013.01); *G09B 19/0076* (2013.01)

(58) Field of Classification Search
USPC ...................................................... 434/236
See application file for complete search history.

(56) References Cited

U.S. PATENT DOCUMENTS

| 5,074,317 A | 12/1991 | Bondell et al. |
| 5,285,540 A | 2/1994 | Putz |
| 5,287,740 A | 2/1994 | Tomita |
| 5,573,407 A | 11/1996 | Dunford |

(Continued)

FOREIGN PATENT DOCUMENTS

| AU | 2012100308 A4 * | 4/2012 |
| EP | 2270768 A1 | 5/2011 |

(Continued)

OTHER PUBLICATIONS

International Search Report and Written Opinion of International Application No. PCT/IB2014/060225; Aug. 11, 2014; 13 pages.

(Continued)

*Primary Examiner* — Robert J Utama
*Assistant Examiner* — Sadaruz Zaman
(74) *Attorney, Agent, or Firm* — Armstrong Teasdale LLP

(57) ABSTRACT

A computer system for managing toilet training of a person is provided. The computer system includes a memory device, a display device, and a processor in communication with the memory device and the display device. The processor is programmed to receive a first trigger event associated with a toilet training event. The processor is also programmed to display, on the display device, a first multimedia presentation based at least in part on said receipt of the first trigger event. The processor is further programmed to collect feedback data from a user. The processor is also programmed to store the feedback data in the memory device.

33 Claims, 5 Drawing Sheets

(56) References Cited

U.S. PATENT DOCUMENTS

| | | | |
|---|---|---|---|
| 5,710,834 A * | 1/1998 | Rhoads | G06K 7/14 380/202 |
| 5,730,654 A | 3/1998 | Brown | |
| 6,086,377 A * | 7/2000 | Pinder | H04M 1/247 434/118 |
| 6,193,518 B1 * | 2/2001 | Nocera | G06Q 40/00 434/236 |
| 6,203,327 B1 | 3/2001 | Ottrando | |
| 6,250,929 B1 * | 6/2001 | Kolb | G09B 19/0076 4/661 |
| 7,321,315 B2 | 1/2008 | Brumm et al. | |
| 7,411,511 B2 | 8/2008 | Kennish et al. | |
| 7,725,842 B2 | 5/2010 | Bronkema | |
| 7,756,926 B2 | 7/2010 | Tseng et al. | |
| 7,770,783 B2 | 8/2010 | Grant et al. | |
| 7,885,146 B2 | 2/2011 | Parkinson et al. | |
| 7,973,210 B2 | 7/2011 | Long et al. | |
| 7,999,686 B2 | 8/2011 | Kennish et al. | |
| 8,205,158 B2 | 6/2012 | Ganz et al. | |
| 8,261,972 B2 | 9/2012 | Ziegler | |
| 8,267,694 B1 | 9/2012 | Lamka | |
| 8,343,012 B2 | 1/2013 | Redmann | |
| 2003/0054326 A1 * | 3/2003 | Aaron-Barrada | 434/236 |
| 2003/0123330 A1 * | 7/2003 | Carter | G04F 1/005 368/109 |
| 2003/0207237 A1 | 11/2003 | Glezerman | |
| 2004/0018474 A1 * | 1/2004 | D'Ippolito | G09B 19/0076 434/236 |
| 2004/0230549 A1 | 11/2004 | Freer et al. | |
| 2005/0064377 A1 | 3/2005 | Whitfield | |
| 2005/0130113 A1 | 6/2005 | Bergan | |
| 2005/0239024 A1 * | 10/2005 | Kemp et al. | 434/236 |
| 2005/0239029 A1 | 10/2005 | Yzermans | |
| 2006/0029921 A1 | 2/2006 | Walther et al. | |
| 2006/0204938 A1 | 9/2006 | Field | |
| 2006/0238361 A1 | 10/2006 | Donlin | |
| 2007/0033059 A1 | 2/2007 | Adkins | |
| 2007/0049885 A1 | 3/2007 | Phillips | |
| 2007/0159522 A1 | 7/2007 | Neven | |
| 2007/0182826 A1 | 8/2007 | Miller et al. | |
| 2007/0222618 A1 * | 9/2007 | Randall | G09B 19/0076 340/573.1 |
| 2008/0026716 A1 | 1/2008 | Billmaier et al. | |
| 2008/0082063 A1 | 4/2008 | Ales et al. | |
| 2008/0109309 A1 | 5/2008 | Landau et al. | |
| 2008/0147502 A1 | 6/2008 | Baker | |
| 2009/0108057 A1 | 4/2009 | Mu et al. | |
| 2009/0202974 A1 | 8/2009 | Sohn et al. | |
| 2009/0326417 A1 | 12/2009 | Ales | |
| 2010/0209898 A1 | 8/2010 | Ward | |
| 2010/0318407 A1 | 12/2010 | Leff et al. | |
| 2011/0036915 A1 | 2/2011 | Hamilton | |
| 2011/0154174 A1 | 6/2011 | Liu et al. | |
| 2011/0183710 A1 | 7/2011 | Selva | |
| 2011/0183712 A1 | 7/2011 | Eckstein et al. | |
| 2011/0258031 A1 | 10/2011 | Valin et al. | |
| 2011/0264527 A1 | 10/2011 | Fitzpatrick et al. | |
| 2012/0115115 A1 | 5/2012 | Rapoza | |
| 2012/0208155 A1 * | 8/2012 | Deleo | 434/236 |
| 2012/0231424 A1 * | 9/2012 | Calman | G09B 25/04 434/72 |
| 2012/0237919 A1 | 9/2012 | Kelly | |
| 2012/0322041 A1 * | 12/2012 | Weisman | G09B 7/00 434/308 |
| 2013/0110064 A1 | 5/2013 | Richardson et al. | |
| 2013/0266924 A1 * | 10/2013 | Zelin | G09B 7/00 434/362 |
| 2014/0154654 A1 * | 6/2014 | Jackson et al. | 434/247 |
| 2014/0155047 A1 * | 6/2014 | Jackson | H04W 4/00 455/418 |
| 2014/0170632 A1 * | 6/2014 | Doshi | 434/365 |

FOREIGN PATENT DOCUMENTS

| | | |
|---|---|---|
| GB | 2466717 A | 1/2010 |
| JP | 2006309287 | 11/2006 |
| WO | 2007134376 A1 | 11/2007 |
| WO | 2009143564 A1 | 12/2009 |
| WO | 2010059546 A1 | 5/2010 |

OTHER PUBLICATIONS

International Search Report and Written Opinion of International Application No. PCT/IB2014/061665; Sep. 2, 2014; 9 pages.

Cox et al.,"Additive benefits of laxative, toilet training, and biofeedback therapies in the treatment of pediatric encopresis", Journal of Pediatric Psychology, 1996, pp. 659-670, vol. 21, No. 5.

* cited by examiner

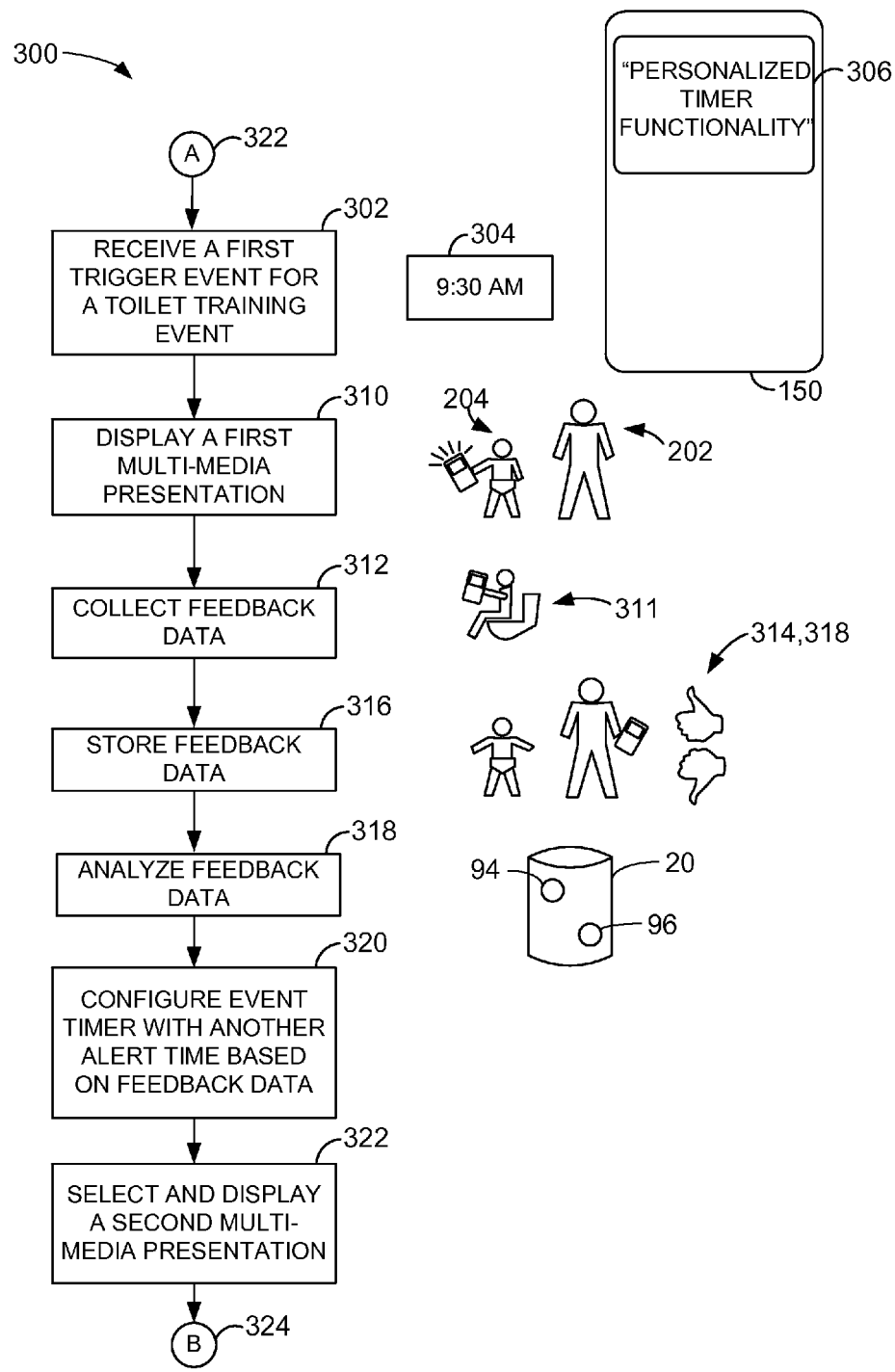

SYSTEMS AND METHODS FOR MANAGING THE TOILET TRAINING PROCESS OF A CHILD

BACKGROUND

The field of the present invention relates generally to toilet training a person and, more particularly, to a network-based system and method for toilet training a child that includes a user computing device having a toilet training management application configured to customize toilet training alerts and associated entertainment experiences based on feedback received during the process.

Toilet training a child is a process conducted over weeks or months, and often involves many manual efforts involving both the parent and the child. When a child is physically ready for toilet training, the parent helps the child through the process of learning to control their bladder and bowel. Although a child may be physically ready to toilet train, the child may not be mentally enthusiastic about performing the recommended toilet training steps. To help the child through the process, a parent will often employ helpful techniques. Known techniques during toilet training include: ritualistic behavioral routine such as having the child sit on the toilet at regular intervals; positive reinforcement such as rewarding the child with a treat or praising the child after a particular achievement; and negative reinforcement such as scolding the child if the child is not willing to participate in some way.

One known problem with the toilet training process is a lack of willingness on the part of the child to participate in the necessary training events and rituals. For example, as a part of the training process, a parent may have the child sit on a toilet at various times during the day. This step both helps the child become acclimated to sitting on the toilet, as well as positioning the child for a potential event. If the child is resistant to this step, then the parent may try to coax the child with a promise of a reward. Or, the parent may give the child a book to occupy the child while sitting on the toilet so that the child will remain seated longer. But these techniques are often limited in their usefulness. Children can quickly tire of sitting on the toilet with just a book, or just a promise. Further, under some known systems, it is often the parent that must initiate these events. Or a parent may have difficulty getting the child to take a break from their present activities. With a child who is resistant to the process, or who does not want to be interrupted from their current activities, the insistence on participating in a toilet training event can turn the parent into the "bad guy" in the child's eyes.

Another known problem with the toilet training process is the differing schedules and other situational variables of individual children. For example, some children may start their day based on a fixed schedule of a parent's routine. Others awake on their own schedule, but some may rise earlier than others. Further, timing of bladder and bowel evacuation events may be quite different for children, based on various situational variables such as diet, meal routines, daily activity routines, and personal biology. Some known systems adapt a rigid structure for the timing of toilet training events. For example, a parent may simply initiate a toilet training event at a predetermined time of the day, or after a fixed period of time between events. Such approaches do not account for personal situational variables, nor do they adapt to the child's patterns based on prior successes or failures.

Thus, there is a need for a system that can assist the parent with initiating toilet training events, motivate the child to participate more readily in the individual toilet training events, and adapt to the child's routines and personal differences.

BRIEF DESCRIPTION OF THE DISCLOSURE

In one aspect, a computer system for managing toilet training of a person is provided. The computer system includes a memory device, a display device, and a processor in communication with the memory device and the display device. The processor is programmed to receive a first trigger event associated with a toilet training event. The processor is also programmed to display, on the display device, a first multi-media presentation based at least in part on said receipt of the first trigger event. The processor is further programmed to collect feedback data from a user. The processor is also programmed to store the feedback data in the memory device.

In another aspect, a computer-based method for managing toilet training of a person is provided. The method is performed using a processor in communication with a memory device and a display device. The method includes receiving, by the processor, a first trigger event associated with a toilet training event. The method also includes displaying, on the display device, a first multi-media presentation based at least in part on the receiving of the first trigger event. The method further includes collecting feedback data from a user. The method also includes storing the feedback data in the memory device.

In yet another aspect, computer-readable storage media having computer-executable instructions embodied thereon are provided. When executed by at least one processor, the computer-executable instructions cause the processor to receive a first trigger event associated with a toilet training event. The computer-executable instructions also cause the processor to display, on the display device, a first multi-media presentation based at least in part on the receipt of the first trigger event. The computer-executable instructions further cause the processor to collect feedback data from a user. The computer-executable instructions also cause the processor to store the feedback data in the memory device.

BRIEF DESCRIPTION OF THE DRAWINGS

FIG. 3 is a flow chart of an example method for managing the toilet training process of a person using the computing device in FIG. 1b.

DETAILED DESCRIPTION OF THE DISCLOSURE

Figure 1A:
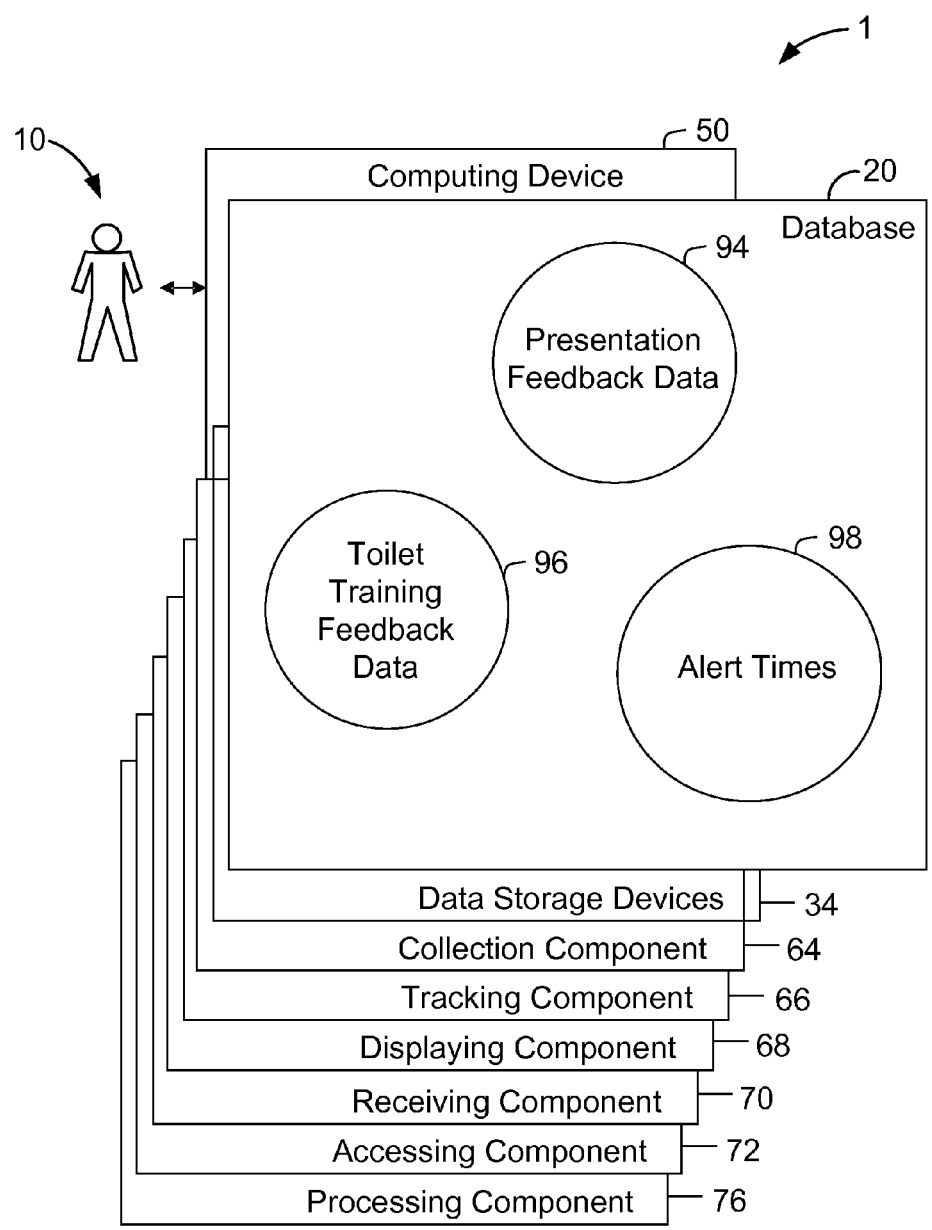
FIG. 1a shows an example configuration of a database within a computing device, along with other related computing components, that may be used during the toilet training process of a child.

Embodiments of the systems and methods described herein include a toilet training management system that assists a supervisor of toilet training, such as a parent, a grandparent, a guardian, a babysitter, a sibling, or some other caregiver (collectively referred to herein as "parent"), in toilet training a person, such as a child of the parent. More specifically, the system includes a toilet training management application ("TTM app") operating on a user computing device, often a "smartphone" or computer tablet. The parent downloads the TTM app to their user computing device. The TTM app includes a suite of functionality (the "base set of functionality") that encourages the parent to begin the toilet training process with their child, and is configured to help both the parent and the child achieve their goals. This base set of functionality includes numerous tools helpful with toilet training the child, including at least one of: games, photos, videos, songs, music, simulated phone calls, training tips, training articles, augmented reality content, simulated training characters, pop-up events, and a portal to online training content. As explained below, upon the initial download of the TTM app, only the base set of functionality is initially enabled for the parent to use. The TTM App includes additional functionality that is unlocked later, after purchase.

The TTM app includes an additional set of functionality (the "personalized timer functionality", or "personalized timer") that is used by the parent and child daily during the toilet training process. The personalized timer has multiple features and benefits.

First, the personalized timer includes an event timer that initiates reminders to parent and child to attempt a toilet training event, such as having the child spend some time sitting on the toilet. Having the TTM app initiate a reminder to the child removes the burden of remembering and the burden of being the "bad guy" from the parent. Further, the personalized timer alert leverages various entertaining aspects of multimedia for motivational and entertainment purposes. For example, a child may be more motivated and excited about the reminder if the reminder includes an entertaining video, or a simulated call from a favorite cartoon character, or the promise of a reward through the TTM app games. And the parent's role may be assisted by the favorite character acting as the face and mouthpiece of the toilet training process. For example, the child may be alerted to new toilet training events by a "pop-up" alert delivered by the favorite character (through the TTM app) upon certain trigger events, such as at a particular alert time, or while playing games in the TTM app or in other applications.

Second, the personalized timer adapts to the particular patterns and preferences of the parent and child. The TTM app and the personalized timer gather data associated with the child's toilet training progress. For example, the personalized timer may gather data after an alert and subsequent toilet training event. The personalized timer may request data regarding the level of success, such as asking the parent whether the child was completely non-participative, or whether the child participated but no bladder or bowel event occurred, or whether the child participated and was successful. Such "success data," or "toilet training feedback data," is used to adjust future events. For example, the personalized timer may adjust the length of time between alerts based on the nature of the success data. The personalized timer may also adjust the nature of the entertainment experience or reward provided to the child based on the "success data." For example, if the child was completely non-participative when presented with an alert using one entertainment experience, the timer may attempt to use a different type of entertainment experience for the next alert. Such adjustments help enhance the success of the toilet training process.

Additionally, this personalized timer functionality may not be included with the base functionality of the TTM app. In some embodiments, the personalized timer functionality must be enabled each day. Each day, or on some other periodic basis, the parent and child enable the personalized timer functionality by scanning an image with the user device storing the TTM app. The image may be on the training product itself, or may be included with the packaging of the product. In some embodiments, each image is limited in its use. For example, each image may be uniquely identifiable, and may only activate the personalized timer functionality once, or some other set number of times. Once the image is scanned, the personalized timer functionality is enabled for use for a period of time. After that period of time, the functionality becomes disabled, and another image must be scanned to re-enable and continue use.

The following detailed description illustrates embodiments of the invention by way of example and not by way of limitation. It is contemplated that the invention has general application to enabling application functionality through the use of scanning an in-package image after sale, and to incentivizing achievement of milestones, regardless of the particular performance objective.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

As used herein, the term "toilet training event" is used, generally, to describe a training activity, or "event," associated with the toilet training process of a child. For example, and without limitation, toilet training events may include: a parent having the child visit the bathroom and wash hands; a child watching training videos associated with toilet training or toilet training products; and a child spending some time sitting on the toilet.

The systems and methods described herein may be implemented using computer programming or engineering techniques including computer software, firmware, hardware, or any combination or subset thereof, wherein the technical effects may be achieved by performing at least one of the following steps: (a) providing a user computing device, wherein the user computing device includes a processor coupled to a memory, a display device, and a camera device; (b) storing a TTM app on the memory; (c) providing an event timer included within the TTM app, wherein the event timer includes an alert time; (d) processing input data at the computing device; (e) receiving trigger events associated with toilet training events; (f) displaying multi-media presentations based on trigger events; (g) collecting feedback data from a user; (h) analyzing feedback data; (i) selecting and displaying multi-media presentations from a plurality of multi-media presentations based on the analyzing; (j) configuring the event timer to include an alert time based on the entertainment feedback and success feedback; (k) receiving trigger events including event timer alerts, scanning of images, reaching a predetermined point during a multi-media presentation, and user-initiated events including input from a user; (l) displaying multi-media presentations including a virtual character instructing a user to provide input regarding toilet training events; and (m) displaying multi-media presentations including a virtual character providing an instructional presentation to a user regarding toilet training and toilet training products.

FIG. 1a shows an example configuration 1 of a database 20 within a computing device 50, along with other related computing components, that may be used during the toilet training process of a child. Database 20 is coupled to several separate components within computing device 50, which perform specific tasks.

Computing device 50 includes a collection component 64 for collecting information from users into database 20, a tracking component 66 for tracking information, a displaying component 68 to display information, a receiving component 70 to receive input from a user 10, and an accessing component 72 to access database 20. Receiving component 70 is programmed for receiving feedback data from user 10. Computing device 50 further includes a processing component 76 for computing entertainment experiences and alert times using presentation feedback data 94, toilet training feedback data 96, and alert times 98 stored on a data storage device 134 containing a variety of information collected by collection component 64. Retrieving component 80 retrieves, downloads and sends information to client system 114 based on a query received from client system 114 regarding various alternatives.

In an exemplary embodiment, database 20 is divided into a plurality of sections, including but not limited to, a presentation (or "entertainment") feedback data section 94, a toilet training (or "success") feedback data section 96, and an alert times section 98. These sections within database 20 are interconnected to update and retrieve the information as required.

Figure 1B:
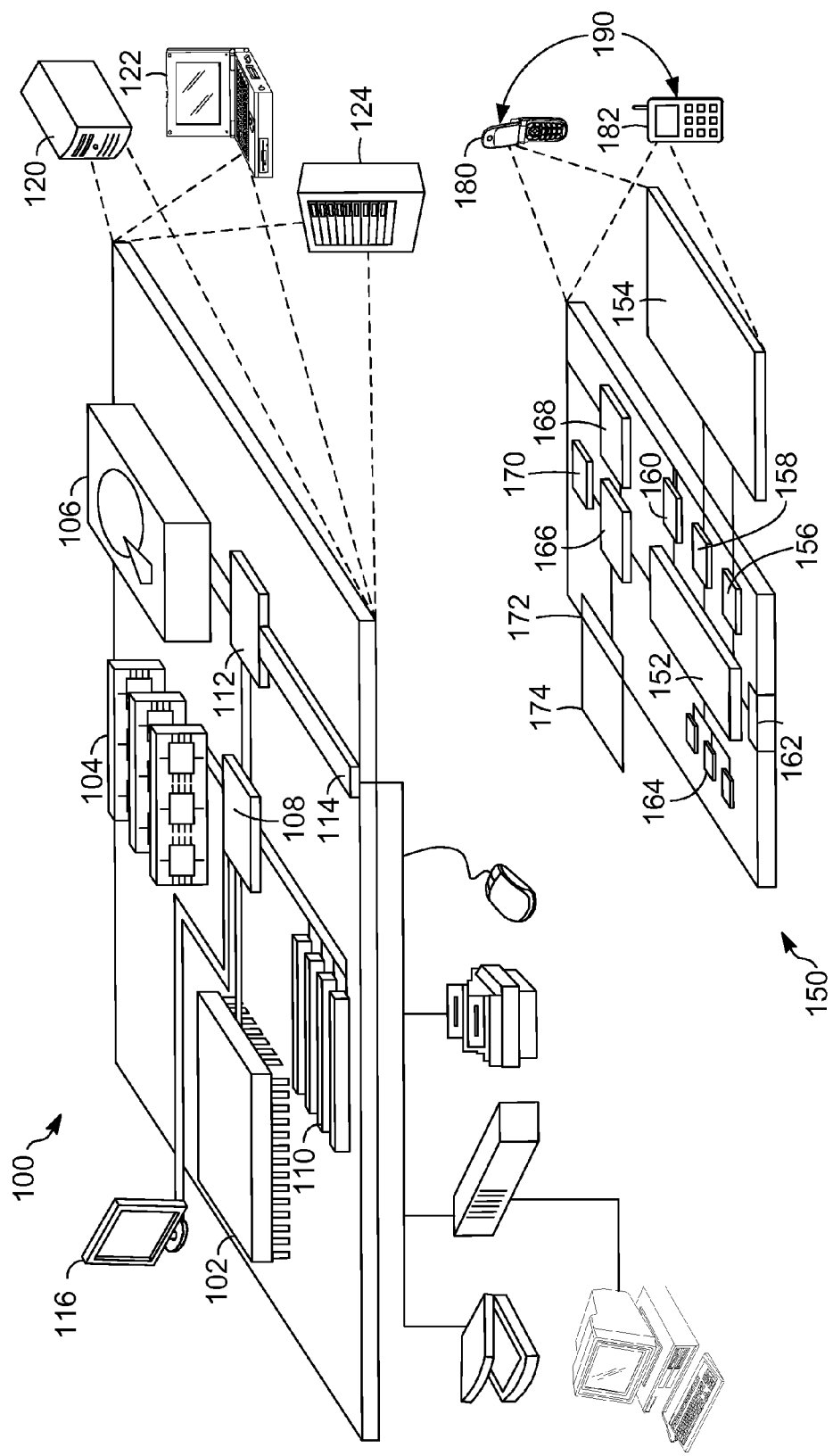
FIG. 1b is a block diagram of example computing systems for managing the toilet training process of a child in accordance with one embodiment of the present disclosure.

FIG. 1b is a block diagram showing example computing devices and associated elements that may be used to implement the systems and methods described herein. FIG. 1b shows an example of a generic computing device 100 and a generic mobile computing device 150, which may be used with the techniques described here. More specifically, computing device 100 and mobile computing device 150 may be similar to computing device 50 (shown in FIG. 1a). The computing device 100 is intended to represent various forms of digital computers, such as laptops, desktops, workstations, personal digital assistants, servers, blade servers, mainframes, and other appropriate computers. The computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

The computing device 100 includes a processor 102, memory 104, a storage device 106, a high-speed interface or controller 108 connecting to memory 104 and high-speed expansion ports 110, and a low-speed interface or controller 112 connecting to low-speed bus 114 and storage device 106. Each of the components 102, 104, 106, 108, 110, and 112, are interconnected using various buses, and may be mounted on a common motherboard or in other manners as appropriate. The processor 102 can process instructions for execution within the computing device 100, including instructions stored in the memory 104 or on the storage device 106 to display graphical information for a Graphical User Interface ("GUI") on an external input/output device, such as display 116 coupled to high-speed controller 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system).

The memory 104 stores information within the computing device 100. In one implementation, the memory 104 is a volatile memory unit or units. In another implementation, the memory 104 is a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. In another implementation, storage may be provided by a "cloud" service, such that some data is stored remote from storage device 106 and computing devices 100, 150. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high-speed controller 108 manages bandwidth-intensive operations for the computing device 100, while the low-speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed bus 114. The low-speed bus 114, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Computing device 150 includes a processor 152, memory 164, an input/output device such as a display 154, a communication interface 166, and a transceiver 168, among other components. The device 150 may also be provided with a storage device, such as a microdrive or other device, to provide additional storage. Each of the components 150, 152, 164, 154, 166, 168, and 190 are interconnected using various buses, and several of the components may be mounted on a common motherboard or in other manners as appropriate.

The processor 152 can execute instructions within the computing device 150, including instructions stored in the memory 164. The processor may be implemented as a chipset of chips that include separate and multiple analog and digital processors. The processor may provide, for example, for coordination of the other components of the device 150, such as control of user interfaces, applications run by device 150, and wireless communication by device 150.

Processor 152 may communicate with a user through control interface 158 and user interface 156 coupled to a display 154. The display 154 may be, for example, a TFT LCD (Thin-Film-Transistor Liquid Crystal Display) or an OLED (Organic Light Emitting Diode) display, or other appropriate display technology. The user interface 156 may comprise appropriate circuitry for driving the display 154 to present graphical and other information to a user. The control interface 158 may receive commands from a user and convert them for submission to the processor 152. In addition, an external interface 162 may be provided in communication with processor 152, so as to enable near area communication of device 150 with other devices. External interface 162 may provide, for example, for wired communication in some implementations, or for wireless communication in other implementations, and multiple interfaces may also be used.

The memory 164 stores information within the computing device 150. The memory 164 can be implemented as one or more of a computer-readable medium or media, a volatile memory unit or units, or a non-volatile memory unit or units. Expansion memory 174 may also be provided and connected to device 150 through expansion interface 172, which may include, for example, a SIMM (Single In Line Memory Module) card interface. Such expansion memory 174 may provide extra storage space for device 150, or may also store applications or other information for device 150. Specifically, expansion memory 174 may include instructions to carry out or supplement the processes described above, and may also include secure information. Thus, for example, expansion memory 174 may be provided as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 164, expansion memory 174, or memory on processor 152, that may be received, for example, over transceiver 168 or external interface 162.

Device 150 may communicate wirelessly through communication interface 166, which may include digital signal processing circuitry where necessary. Communication interface 166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 168. In addition, short-range communication may occur, such as using a Bluetooth, Wi-Fi, or other such transceiver (not shown). In addition, GPS (Global Positioning system) receiver module 170 may provide additional navigation- and location-related wireless data to device 150, which may be used as appropriate by applications running on device 150.

Device 150 may also communicate audibly using audio codec 160, which may receive spoken information from a user and convert it to usable digital information. Audio codec 160 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

Device 150 includes a digital camera 190. The digital camera 190 may capture real-world images in either still-image or full-motion video. The digital camera 190 may store images or video in memory 164 or expansion memory 174. The digital camera 190 may also display images or video directly to user interface 156. Captured images or video may be accessed by processor 152 for image processing.

The computing device 150 may be implemented in a number of different forms, as shown in the figure. For example, it may be implemented as a cellular telephone 180. It may also be implemented as part of a smart phone 182, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device (e.g., computing device 100 and/or 150) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

In the example embodiment, the TTM app may be stored on the computing device 100 and downloaded to computing device 150. Computing device 150 is configured to process the TTM app, receive data inputted by a user, execute functionality included within the TTM app, and output results based on inputted data and the functionality of the TTM app.

As illustrated in FIG. 1b, computing devices 100 and 150 are configured to receive and/or retrieve electronic documents from various other computing devices connected to computing devices 100 and 150 through a communication network, and store these electronic documents within at least one of memory 104, storage device 106, and memory 164. Computing devices 100 and 150 are further configured to manage and organize these electronic documents within at least one of memory 104, storage device 106, and memory 164 using the techniques described herein. Such electronic documents may include, for example, profile information associated with a user of computing devices 100, 150, or progress charts associated with toilet training of the user, or feedback data associated with toilet training. These electronic documents may be stored on "cloud" storage (i.e., remote from computing device 100, 150).

Figure 2A:
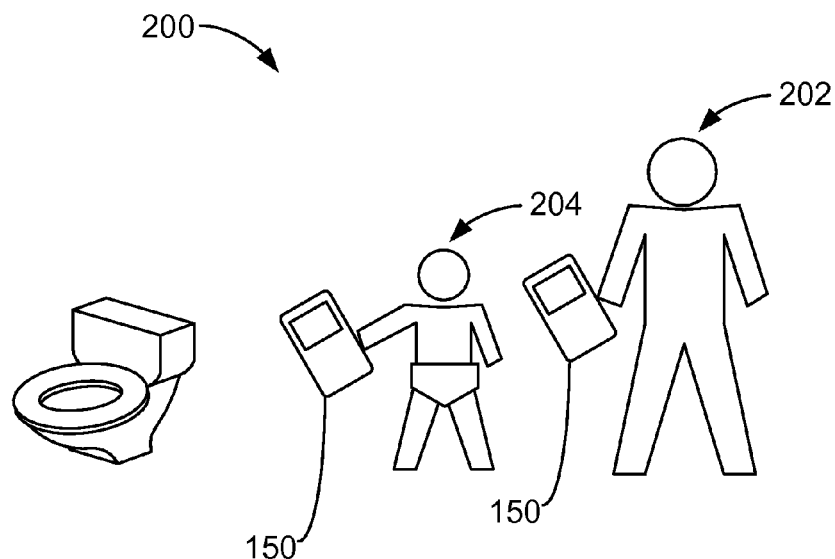
FIG. 2a is a diagram of an example parent and child that are involved with the toilet training process using the computing device shown in FIG. 1b.

FIG. 2a is a diagram 200 of an example parent 202 and child 204 that are involved with the toilet training process using computing device 150 (shown in FIG. 1b). In the example embodiment, computing device 150 is a smart phone or hand held computing tablet. There may be one or multiple computing devices 150 involved with the toilet training process for child 204. A "TTM application" or "TTM app" is downloaded and installed on computing device 150. The TTM app may be downloaded, for example, through the Internet, or by any other method that facilitates operation of the systems and methods as described herein. The TTM app includes at least a base set of functionality and a personalized timer functionality. The functions provided by the personalized timer are discussed in greater detail below.

Figure 2B:
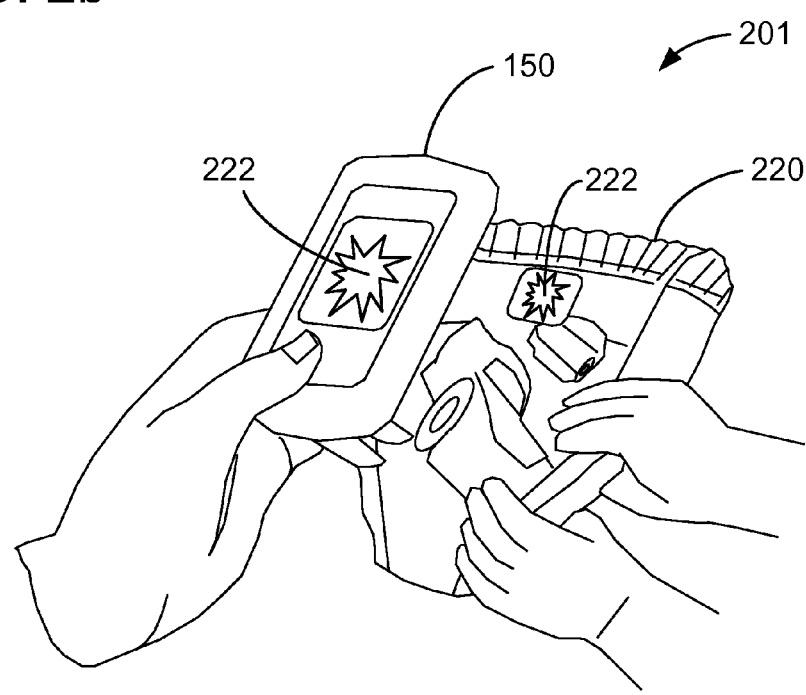
FIG. 2b is a diagram of an example toilet training product that the parent and child in FIG. 2a use with the computing device shown in FIG. 1b during the toilet training process.

FIG. 2b is a diagram 201 of an example toilet training product 220 that parent 202 (shown in FIG. 2a) and child 204 (shown in FIG. 2a) use during the toilet training process using computing device 150. In the example embodiment, toilet training product 220 is a moisture absorbent toilet training under-pant used by the child for toilet training. A post-sale image 222 is provided. In some embodiments, post-sale image 222 appears on toilet training product 220. In other embodiments, post-sale image 222 may appear elsewhere within a packaging (not shown) of toilet training product 220. In operation, parent 202 and/or child 204 utilize the TTM app and computing device 150 to scan post-sale image 222. The scanning of post-sale image 222, in some embodiments, activates the personalized timer functionality within the TTM app as described herein.

FIG. 3 is a flow chart of an example method 300 for managing the toilet training process of child 204 using computing device 150. In the example embodiment, method 300 involves using computing device 150 and the TTM app (not separately shown). In some embodiments, computing device 150 is a smartphone or tablet computer upon which the user has downloaded and installed the TTM app. The TTM app includes sets of "functionality". As used herein, the terms "functionality", "set of functionality", and "function" are intended to refer to a set of computer-implemented instructions that, when executed by the mobile computing device 150, cause the computing device 150 to perform one or more operations. For example, and without limitation, a set of instructions that allows the user to listen to music may be described as "a functionality" or "a function". Additionally, the term "functionality" and "set of functionality" may refer to an individual function or to a set of functions.

In the illustrated embodiment, computing device 150 and the TTM app include a base functionality and a personalized timer functionality 306. In some embodiments, these sets of functionality are provided as portions of a single software application, the TTM app. After installation of the TTM app, the base functionality allows an initial set of functions relative to toilet training such as, without limitation, product information, product advertisements, games, photos, videos, songs, music, a rewards system, simulated phone calls, training tips, training articles, story books, simulated training characters, persistent progress tracking, a portal to online training content, augmented reality ("AR") functionality, AR content, and image capture. It should be understood, however, that additional functionality necessary to implement the systems and methods described herein, such as, without limitation, displaying augmented reality content, and capturing real-world images, may also be included, without limitation, in the base functionality, personalized timer functionality 306, or other enhanced functionality, or in any other way which allows the operation of the systems and methods as described herein. It should also be understood that other embodiments may provide only limited functionality in the base functionality, shifting more functionality to some "enhanced" functionality level.

For purposes of illustration, it is presumed that, prior to executing operation 302, personalized timer functionality 306 is "enabled." In operation, the user of the TTM app can only access a particular functionality, other than the base functionality, if that particular functionality's enablement status is "enabled." It is understood that "enablement status" is merely a term of logical construction, and not an element of physical structure. It should be understood that status enablement and disablement of functionality may be provided in any way which allows the operation of the systems and methods described herein. The enabling and disabling of personalized timer functionality is discussed in greater detail with respect to FIG. 4, below.

In the example embodiment, a first trigger event is received 302. A "trigger event", as used herein, is an event that engages some functionality of personalized timer 306. Trigger events may be based on, for example and without limitation, an alert time (i.e., some pre-determined absolute time), or some pre-determined point during a presentation, or the starting of the TTM app, or after scanning of an image, or after taking input from a user. In some embodiments, the trigger event may occur during a presentation. For example, a child may be engaged in watching a presentation, such as a story, and the trigger event is set to occur, and is delivered at a specific point during the story. The trigger event may initiate one of the characters in the story to ask the child if they have attempted a toilet training event in the recent past, and if not, may prompt the child to initiate an event. In other embodiments, the scanning of an image is a trigger event. For example, parent 202 and child 204 may start out the day by scanning an image on child's 204 first training pant of the day, or on product packaging associated with toilet training products. This trigger event may start the day's process by activating functionality, initiating configuration and/or staging of timer alert events, or otherwise beginning child's daily routine. In still other embodiments, the trigger event may occur after taking input from a user. For example, the trigger event may be the starting of the TTM application or the personalized timer functionality 306. Or the trigger event may be parent 202 or child 204 initiated, such as through interaction with the TTM application.

In this example embodiment, the first trigger event is an alert time 304. More specifically, the event timer of personalized timer functionality 306 receives first alert time 304 from parent 202 using personalized timer functionality 306 of the TTM app on computing device 150. As used herein, the term "alert time" refers, generally, to a time at which to initiate an alert, or a trigger event. Computing device 150 includes a clock time tracking mechanism such as is commonly provided by computing devices and their operating systems. The clock timing mechanism allows computing device 150 and its applications to acquire and perform tasks based on the local clock time, or absolute time, as well as track changes in time. During operation, first alert time 304 is a time associated with a toilet training event for child 204. First alert time may be initially received 302 from parent 202, or from a default setting within personalized timer functionality 306, or after computation involving feedback data collected during operation, as discussed in greater detail below.

In the example embodiment, upon receiving the trigger event, a first multi-media presentation (or "entertainment experience") is displayed 310 on computing device 150. As used herein, the terms "multi-media presentation" and "entertainment experience" are used synonymously, and generally refer to any computer-generated experience using computing device 150 that entertains the user. Entertainment experiences may include, for example and without limitation, audio and/or video music experiences, video display experiences, augmented reality experiences, rewards, simulated communication from cartoon characters, and digital gaming experiences. Further, entertainment experiences may include educational and/or instructional content as well, in regard to toilet training and otherwise. In some embodiments, child 204 and/or parent 202 may be associated with an "avatar" within the multi-media presentation. The term "avatar", as used herein, refers generally to an entity or character within a multi-media presentation, such as an interactive video game. Avatars are often used to represent the user, or player, of the game within the virtual game world. Further, in some embodiments, multi-media presentation may be a multi-player game in which parent 202 and child 204 participate together in a shared experience, and may be represented within the game by separate avatars.

In some embodiments, the first entertainment experience may be experienced by child 204 prior to or during a toilet training event 311. For example, child 204 may be alerted by receiving a simulated phone call from a cartoon character who delivers the alert to the child, or the child may be presented with access to a game. Such a use may serve to occupy child 204 and facilitate greater time on the toilet. In other embodiments, child 204 may be provided with the promise of an entertainment experience after participation in a toilet training event. Such a use may incentivize participation of child 204.

In some situations, computing device 150 may be engaged in other activities at the trigger event (i.e., in the example embodiment, the alert time 304). For example, child 204 may be engaged playing a game on computing device 150 at the alert time 304. In other situations, computing device 150 may be powered on but not being actively used at the time, and may be in a "sleep mode." Personalized timer functionality 306, in the example embodiment, is configured as an "always on" functionality. "Always on", as used herein, means that the personalized timer functionality 306 will continue running in a capacity enough to enable personalized timer functionality 306 to operate as described herein, including at least allowing the functionality of the alert to be executed upon arrival of alert time 304. In some embodiments, this "always on" functionality may be enabled by running some or all of personalized timer functionality 306 in the background processing of the operating system of computing device 150. "Always on" does not mean that personalized timer functionality 306 must be enabled when computing device 150 is in a powered off state.

In some embodiments, the trigger event may display 310 a multi-media presentation involving a favorite character. The favorite character may operate as the central "friend", or "trusted guide", or "coach" of the child throughout the toilet training process. The favorite character may act as a proxy or surrogate for the parent by delivering reminders and instructional content during the toilet training process. The instructional content, in some embodiments, involves instructing the child on use of a particular toilet training product, such as a particular moisture absorbent pant. The favorite character may be customizable by parent 202 or child 204. Further, the trigger event may interrupt a multi-media presentation while it is being displayed 310, and prompt the child to engage in toilet training event 311. In some embodiments, parent 202 may be associated with another character, such as a "trusted advisor." This trusted advisor may be different than the child's favorite character, and may deliver instructional or advisory content to parent 202 throughout the toilet training process.

After the toilet training event 311, in the example embodiment, feedback data is collected 312. In some embodiments, feedback data includes one or more of presentation feedback data 94 and toilet training feedback data 96. As used herein, "entertainment feedback data", or "presentation feedback data", includes data indicating whether and/or how much child 204 enjoyed the first multi-media presentation. For example, presentation feedback data 94 may be as simple as child 204 and/or parent 202 providing a "thumbs up" or "thumbs down" evaluation of the first multi-media presentation. Further, as used herein, "success feedback data", or "toilet training feedback data", includes data indicating whether and/or how successful child 204 was with the toilet training event 311. For example, toilet training feedback data 96 may include a discrete list of possible results, such as "child refused participation", "child participated but the alert time came too late", "child participated but was unsuccessful", and "child participated and successfully had a bladder or bowel event." It should be understood, however, that other types of entertainment feedback data 94 and toilet training feedback data 96 may be collected 312 without deviating from the present invention.

Feedback data 94, 96 is then stored 316 in database 20. More specifically, in the example embodiment, presentation feedback data is stored in presentation feedback section 94, and toilet training feedback data is stored in success feedback section 96 of database 20. Feedback data 94, 96 is accessed during additional processing steps, discussed further below.

With the presentation and toilet training feedback data 94, 96, the personalized timer functionality 306, in some embodiments, may analyze 318 the feedback data, and may configure 320 another trigger event. Analysis 318 of feedback data, in the example embodiment, includes analyzing presentation feedback data 94 and toilet training feedback data 96 to assist with further customization of future trigger events and multi-media presentation selections. For example, presentation feedback data 94 may indicate how much a certain child enjoys musical experiences, or interactive game experiences, and thus may influence favoring those types of experiences for the child. And toilet training feedback data 96 may indicate better or worse timings of certain events, like how long between toilet training events leads to better success, or how much participation will be achieved based on the timings between toilet training events.

In the example embodiment, the other trigger event is a second alert time (not separately shown). The second alert time will be processed similar to first alert time 304 using method 300. In the example embodiment, the second alert time is based at least in part on data gathered from any combination of prior alert times, including first alert time 304. The second alert time may be based on toilet training feedback data 96 and/or presentation feedback data 94.

In some embodiments, configuring 320 the second alert time based on toilet training feedback data 96 analysis 318, in the example embodiment, includes receiving feedback based on one or more criteria including: child participation, child success in a bladder and/or bowel event, and occurrence or lack thereof of a pre-alert bladder and/or bowel event. A time gap between alert times may be set to a default value, but then may be adjusted based on one or more of the feedback criteria received during the toilet training process. For example, if the prior time gap between alerts was 3 hours, but the child experienced a pre-alert bladder or bowel event, the second alert time may be configured 320 to be 2 hours and 45 minutes (i.e., less than the prior time gap between alerts). In some embodiments, parent 202 may also provide adjustments to either the second alert time or the selection of the subsequent multi-media presentations. Further, in some embodiments, alert times may be configured 320 based on absolute time of day, or at/after certain set events during the day. For example, some children may be on set schedules for meals, such as always having breakfast at 9:00 AM, and the right time to go may be just after meals. Configuring 320 the second alert time based on toilet training feedback data 96 may include adjustments based on these recurring patterns.

In other embodiments, a second multi-media presentation is selected from a plurality of entertainment experiences and displayed 322. Selecting the second multi-media presentation may be based on presentation feedback data 94 regarding the first multi-media presentation. Personalized timer functionality 306 and the TTM app include a plurality of multi-media presentations from which to select 322 entertainment experiences. In some embodiments, a multi-media presentation that receives some number of negative feedbacks during prior alerts will be weighted less than other multi-media presentations, or even completely avoided. In other embodiments, multi-media presentations will be pre-configured with characteristic qualities, and multi-media presentations receiving negative feedback will cause other multi-media presentations with similar characteristic qualities to be reduced in weight or avoided. Further, in the example embodiment, presentation feedback data 94 and toilet training feedback data 96 may be correlated together for additional benefits. For example, an unwillingness to participate (a type of "success" feedback data) when presented with a certain type of multi-media presentations may be considered as evidence of negative response toward those types of multi-media presentations, and thus those types of multi-media presentations may be reduced in weight (i.e., treated as negative "presentation" feedback data).

In operation, method 300 continues 322 processing throughout the day of child 204 and parent 202, generating the next alert based on feedback data from the prior alerts. In some embodiments, however, personalized timer functionality 306 becomes disabled and must be re-enabled to continue functioning. In the example embodiment, at the end of each day (i.e., for example, at midnight of each day, after child 204 has presumably gone to sleep), personalized timer functionality 306 is disabled 324 and is re-enabled in a process described below with regard to FIG. 4.

Figure 4:
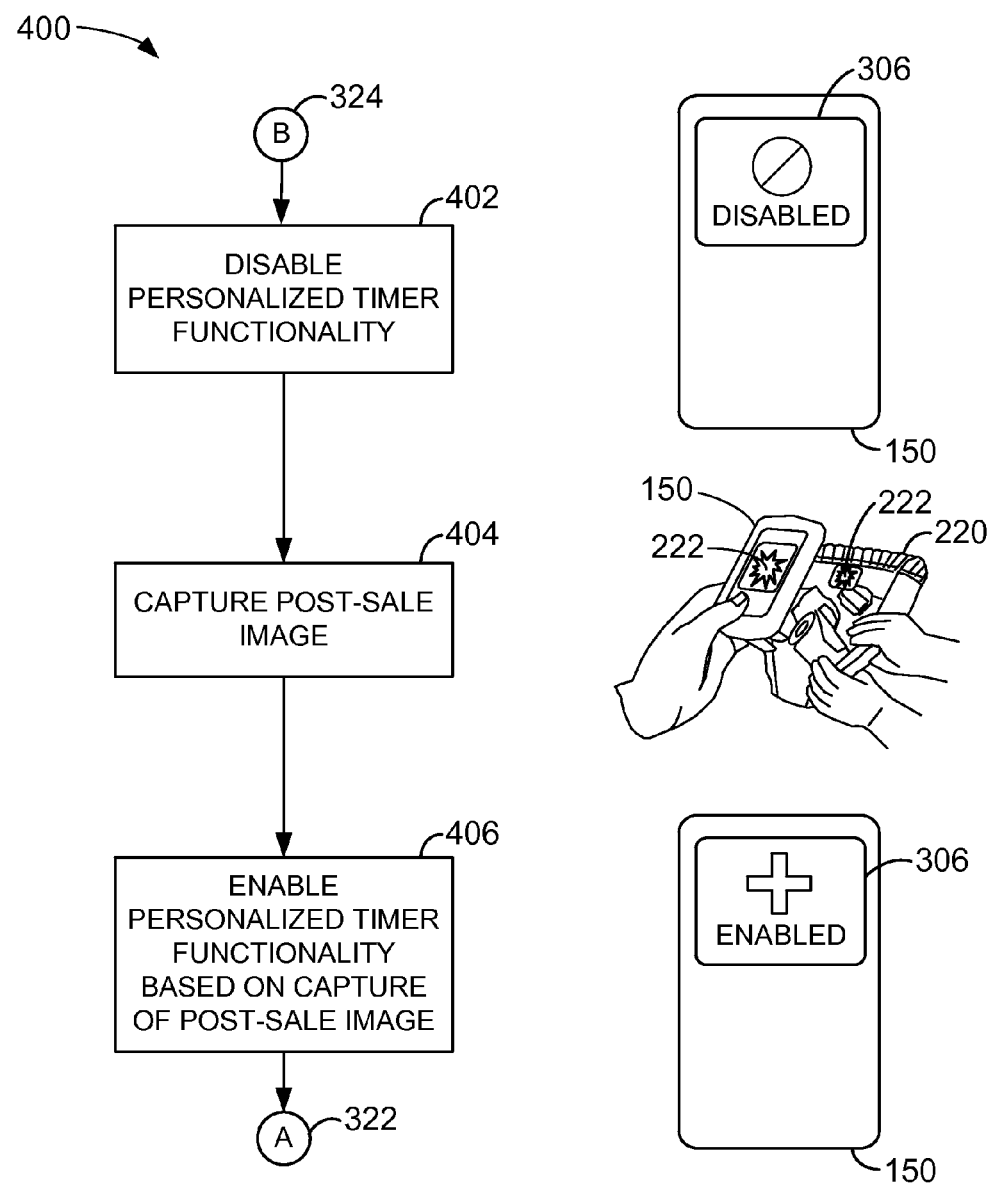
FIG. 4 is a flow chart of another example method for managing the toilet training process of a person using the computing device in FIG. 1b and the toilet training product shown in FIG. 2b.

FIG. 4 is a flow chart of another example method 400 for managing the toilet training process of a child 204 (shown in FIG. 2) using computing device 150 and toilet training product 220. In operation, in the example embodiment, personalized timer functionality 306 is disabled 402 at the end of child's 204 day. "Disabling", as used herein, involves limiting some functionality of personalized timer functionality 306. For example, in the example embodiment, disabling 402 causes personalized timer functionality 306 to disable the alerting functionality described with regard to FIG. 3. In some embodiments, personalized timer functionality 306 becomes disabled after a finite length of time, such as one day, or at a specific time, such as midnight. In some embodiments, parent 202 and child 204 participate in a "goodnight" event that signals disabling of timer functionality 306.

In order to re-enable the disabled 402 functionality of personalized timer functionality 306, parent 202 or child 204 must capture 404 post-sale image 222 using computing device 150. As illustrated in FIG. 4, the post-sale image 222 is captured 404 using the digital camera 190 (shown in FIG. 1b). As used herein, the term "capture" involves the use of the mobile computing device 150 coupled to the digital camera 190, herein alternately referred to as "camera" or "camera device". "Capturing" an "image" generally involves the digital camera 190 processing a digitization of the real-world image, such as, without limitation, taking a digital photograph or a video of the "image". In operation, the parent 202 would capture 404 the post-sale image 222 printed on toilet training product 220 at the beginning of child's 204 morning.

In the illustrated embodiment, upon capturing 404 the post-sale image 222, the post-sale image 222 is then recognized by the computing device 150. As used herein, "recognizing" an "image" involves the processor 102, 152 utilizing any method of identifying the presence of the "image". In some embodiments, recognizing 312 an image utilizes a method of comparing the captured 404 image to a model image (not shown), such as, without limitation, the methods commonly available in the field of image recognition and image processing. In some embodiments, recognizing an image relies on image shape, color, and/or orientation. In some embodiments, the images are designed to assist and/or enable the image recognition process. It should be understood that any image recognition technique that enables operation of the systems and methods as described herein may be used.

In the illustrated embodiment, upon recognizing the post-sale image 222, personalized timer functionality 306 is enabled 406. In operation, this step returns personalized timer functionality 306 to full functionality. In some embodiments, the post-sale image 222 may act as, without limitation, the proof of purchase of a product, thereby providing the purchaser (i.e., parent 202 and/or child 204) access to the otherwise-disabled content (i.e., personalized timer functionality 306). In some embodiments, the TTM app executes method 400. After personalized timer functionality 306 is re-enabled 406, the method 400 returns 322 to method 300 and continues operation for another day.

In other embodiments, a "use counter" (not shown) is associated with post-sale image 222. The use counter tracks how many times the particular post-sale image 222 has been scanned. Re-enabling 406 personalized timer functionality 306 may be limited to only a certain number of times. For example, in some embodiments, a plurality of post-sale images 222 are provided on toilet training products, and each post-sale image 222 is uniquely identifiable, i.e., identifiable as different from the other post-sale images. In this example embodiment, each post-sale image 222 may be usable only once, or may be usable only a certain number of times. In other embodiments, the same post-sale image may appear on all toilet training products shown in a single product package, but may be different than post-sale images on products in other packages. In this example embodiment, the use counter may be tied to the estimated number of days that the entire product package should last. In further embodiments, the use counter may provide "rewards" to the child after a certain number of scans.

In still other embodiments, the user may scan a plurality of images (not separately shown) that activate different sets of functionality. These images may unlock specific features or presentations. For example, the capture 404 of an image associated with a daytime pant may activate an exciting game experience, or some feature within a game, that serves to excite and stimulate the child, while the capture 404 of another image associated with a nighttime pant may activate a more subdued experience, such as a nighttime song or the reading of a relaxing story, which serves to relax and placate the child. Some images may be associated with certain types of products, and may unlock product-specific functionalities. For example, capture 404 of an image associated with toilet training bathroom wipes may activate an educational video associated with using bathroom wipes, or a video explaining bathroom hygiene and best practices.

The systems and methods described herein help parents in the toilet training process by providing education, training, entertainment, a rewards system, and motivation for both the child and the parent as they engage in the process. These results are achieved by: providing a toilet training management app (the TTM app) to the parent and the child; providing a base set of functionality within the TTM app that provides a personalized timer functionality; enclosing a post-sale image within a toilet training product; providing the TTM app to allow the scanning of the post-sale image in order to enable functionality to the user, where personalized timer functionality includes features appropriate for the toilet training process; disabling the personalized timer functionality after a period of time; altering the user at an alert time; providing entertainment experiences to a child at the alert time; receiving presentation feedback data and toilet training feedback data after an alert; and configuring future entertainment experiences and alert times based on that feedback.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer system for managing toilet training of a person, the computer system comprising:
    a memory device;
    a display device; and
    a processor in communication with the memory device and the display device, the processor is programmed to:
    provide a first set of functionality and a second set of functionality, wherein the first set of functionality and the second set of functionality are configured in a disabled status;
    scan a post-sale image to activate the first set of functionality;
    receive a first trigger event thereby activating the second set of functionality associated with a toilet training event, wherein the first trigger event engages an event timer;
    display, on the display device, a first multi-media presentation based at least in part on a response of said event timer to said receipt of the first trigger event;
    collect feedback data from a user associated with a level of success of the toilet training event;
    store the feedback data in the memory device; and
    adjust the response of the event timer based at least in part on the feedback data.

2. The computer system in accordance with claim 1, wherein the user is one of a child involved with toilet training events and a supervisor of toilet training, wherein the feedback data comprises one of toilet training feedback data including at least one of child participation in toilet training, child success in a bladder event, child success in a bowel event, an occurrence of a pre-alert bladder event, and an occurrence of a pre-alert bowel event.

3. The computer system in accordance with claim 2, wherein the processor is further programmed to:

analyze the feedback data to determine the level of success associated with the toilet training event;

select a second multi-media presentation from a plurality of multi-media presentations based at least in part on the level of success associated with the toilet training event; and display, on the display device, the second multi-media presentation at a later alert time.

4. The computer system in accordance with claim 2, wherein the processor is further programmed to:

analyze the feedback data; and configure said event timer with a first alert time, wherein the first alert time is computed based at least in part on the analysis of the feedback data.

5. The computer system in accordance with claim 1, wherein the first trigger event includes one of an event timer alert, scanning a marker, reaching a predetermined point during the first multi-media presentation, and a user-initiated event including input from a user.

6. The computer system in accordance with claim 1, wherein the first multi-media presentation comprises a virtual character instructing a user to provide input regarding the toilet training event.

7. The computer system in accordance with claim 1, wherein the first multi-media presentation comprises a virtual character providing an instructional presentation to the user regarding toilet training.

8. The computer system in accordance with claim 7, wherein the instructional presentation is associated with a toilet training product.

9. The computer system in accordance with claim 1, wherein displaying a first multi-media presentation comprises:

interrupting the first multi-media presentation during the displaying; and prompting the user to engage in the toilet training event.

10. The computer system in accordance with claim 9, wherein prompting the user comprises prompting by a virtual character using the display device.

11. The computer system in accordance with claim 1, wherein the first multi-media presentation comprises at least one avatar character associated with at least one of a child involved in toilet training and a supervisor of toilet training.

12. A computer-based method for managing toilet training of a person, said method performed using a processor in communication with a memory device and a display device, said method comprising:

providing a first set of functionality and a second set of functionality, wherein the first set of functionality and the second set of functionality are configured in a disabled status;

scanning a post-sale image to activate the first set of functionality;

receiving, by the processor, a first trigger event thereby activating the second set of functionality associated with a toilet training event, wherein the first trigger event engages an event timer;

displaying, on the display device, a first multi-media presentation based at least in part on a response of said event timer to said receiving of the first trigger event;

collecting feedback data from a user associated with a level of success of the toilet training event;

storing the feedback data in the memory device; and adjusting the response of the event timer based at least in part on the feedback data.

13. The method in accordance with claim 12, wherein the user is one of a child involved with toilet training events and a supervisor of toilet training, wherein the feedback data includes one of toilet training feedback data including at least one of child participation in toilet training, child success in a bladder event, child success in a bowel event, an occurrence of a pre-alert bladder event, and an occurrence of a pre-alert bowel event.

14. The method in accordance with claim 13 further comprising:

analyzing the feedback data to determine the level of success associated with the toilet training event;

selecting, by the processor, a second entertainment experience from a plurality of entertainment experiences based at least in part on said level of success associated with the toilet training event; and displaying, on the display device, the second multi-media presentation at a later alert time.

15. The method in accordance with claim 13 further comprising:

analyzing the feedback data; and configuring the event timer with a first alert time, wherein the first alert time is computed based at least in part on said analysis of the feedback data.

16. The method in accordance with claim 12, wherein receiving a first trigger event comprises receiving a first trigger event including one of an event timer alert, scanning an image, reaching a predetermined point during the first multi-media presentation, and a user-initiated event including input from a user.

17. The method in accordance with claim 12, wherein displaying a first multi-media presentation comprises displaying a first multi-media presentation including a virtual character instructing a user to provide input regarding the toilet training event.

18. The method in accordance with claim 12, wherein displaying a first multi-media presentation comprises displaying a first multi-media presentation including a virtual character providing an instructional presentation to the user regarding toilet training.

19. The method in accordance with claim 18, wherein displaying a first multi-media presentation comprises displaying an instructional presentation associated with a toilet training product.

20. The method in accordance with claim 12, wherein displaying a first multi-media presentation comprises:

interrupting the first multi-media presentation during said displaying; and prompting the user to engage in the toilet training event.

21. The method in accordance with claim 12, wherein prompting the user comprises prompting by a virtual character using the display device.

22. The method in accordance with claim 12, wherein said displaying comprises displaying the first multi-media presentation including at least one avatar character associated with at least one of a child involved in toilet training and a supervisor of toilet training.

23. Non-transitory computer-readable storage media having computer-executable instructions embodied thereon, wherein, when executed by at least one processor, the computer-executable instructions cause the processor to:

provide a first set of functionality and a second set of functionality, wherein the first set of functionality and the second set of functionality are configured in a disabled status;

scan a post-sale image to activate the first set of functionality;

receive a first trigger event thereby activating the second set of functionality associated with a toilet training event, wherein the first trigger event engages an event timer;

display, on the display device, a first multi-media presentation based at least in part on a response of said event timer to said receipt of the first trigger event;

collect feedback data from a user associated with a level of success of the toilet training event;

store the feedback data in the memory device; and adjust the response of the event timer based at least in part on the feedback data.

24. The computer-readable storage media in accordance with claim 23, wherein the user is one of a child involved with toilet training events and a supervisor of toilet training, wherein the feedback data comprises one of toilet training feedback data including at least one of child participation in toilet training, child success in a bladder event, child success in a bowel event, an occurrence of a pre-alert bladder event, and an occurrence of a pre-alert bowel event.

25. The computer-readable storage media in accordance with claim 24, wherein the computer-executable instructions further cause the processor to:

analyze the feedback data to determine the level of success associated with the toilet training event;

select a second multi-media presentation from a plurality of multi-media presentations based at least in part on the level of success associated with the toilet training event; and display, on the display device, the second multi-media presentation at a later alert time.

26. The computer-readable storage media in accordance with claim 24, wherein the computer-executable instructions further cause the processor to:

analyze the feedback data; and configure the event timer with a first alert time, wherein the first alert time is computed based at least in part on the analysis of the feedback data.

27. The computer-readable storage media in accordance with claim 23, wherein the first trigger event includes one of an event timer alert, scanning an image, reaching a predetermined point during the first multi-media presentation, and a user-initiated event including input from a user.

28. The computer-readable storage media in accordance with claim 23, wherein the first multi-media presentation comprises a virtual character instructing a user to provide input regarding the toilet training event.

29. The computer-readable storage media in accordance with claim 23, wherein the first multi-media presentation comprises a virtual character providing an instructional presentation to the user regarding toilet training.

30. The computer-readable storage media in accordance with claim 29, wherein the instructional presentation is associated with a toilet training product.

31. The computer-readable storage media in accordance with claim 23, wherein displaying a first multi-media presentation comprises:

interrupting the first multi-media presentation during the displaying; and prompting the user to engage in the toilet training event.

32. The computer-readable storage media in accordance with claim 31, wherein prompting the user comprises prompting by a virtual character using the display device.

33. The computer-readable storage media in accordance with claim 23, wherein the first multi-media presentation comprises at least one avatar character associated with at least one of a child involved in toilet training and a supervisor of toilet training.

* * * * *